May 6, 1958 M. H. HAYES ET AL 2,833,476

REVERSIBLE COUNTER

Filed April 26, 1954 3 Sheets-Sheet 1

May 6, 1958 M. H. HAYES ET AL 2,833,476

REVERSIBLE COUNTER

Filed April 26, 1954 3 Sheets-Sheet 2

United States Patent Office 2,833,476

Patented May 6, 1958

2,833,476

REVERSIBLE COUNTER

Monson H. Hayes and James L. West, Binghamton, N. Y., assignors to Link Aviation, Inc., Binghamton, N. Y., a corporation of New York Application April 26, 1954, Serial No. 425,462

16 Claims. (Cl. 235—92)

In many digital computer, automatic control and instrumentation problems, devices are necessary to count large numbers of pulses at extremely rapid rates. Many of these counting or translating devices must "add" or "subtract," i. e. be reversible. As an example, a reversible counter is used in connection with output signals from an interferometer in Patent No. 2,604,004 to Elihu Root for the purpose of counting interference fringes. The counter used therein must be reversible in order to follow motion in two directions. As another example, Patent No. 2,656,106 to H. P. Stabler shows a reversible pulse counter used as a shaft "quantizer" or "digitizer." In order that shaft rotation in both directions may be measured, a reversible counter must be employed. Furthermore, it is desirable that such counters be direct-coupled. As is well-known in the electronic arts, direct-coupled circuits are less susceptible to "noise," and more reliable because capacitors, which frequently fail and must be replaced, are eliminated from the signal circuits.

It is therefore an object of the invention to provide improved reversible direct-coupled counters.

It is a further object of the invention to provide improved reversible counting circuits which may be cascaded to identical higher order counting circuits to provide counts of extremely large numbers.

It is another object of the invention to provide reversible, direct-coupled counters having no electrical "backlash."

It is an additional object of the invention to provide improved reversible counters utilizing a high speed gaseous glow discharge counting tube.

It is another object of the invention to provide an improved reversible counting circuit operable to receive input voltages phased according to direction.

It is yet a further object of the invention to provide a new and improved counting circuit which may be readily utilized in constructing counters which will count according to any desired base number above "four."

Other objects of the invention will in part be obvious and will in part appear hereinafter.

The invention accordingly comprises the features of construction, combinations of elements, and arrangements of parts, which will be exemplified in the constructions hereinafter set forth, and the scope of the invention will be indicated in the claims.

For a better understanding of our invention, reference may be had to the accompanying drawings, in which.

Figures 3, 7, 8, 9A, 9B:
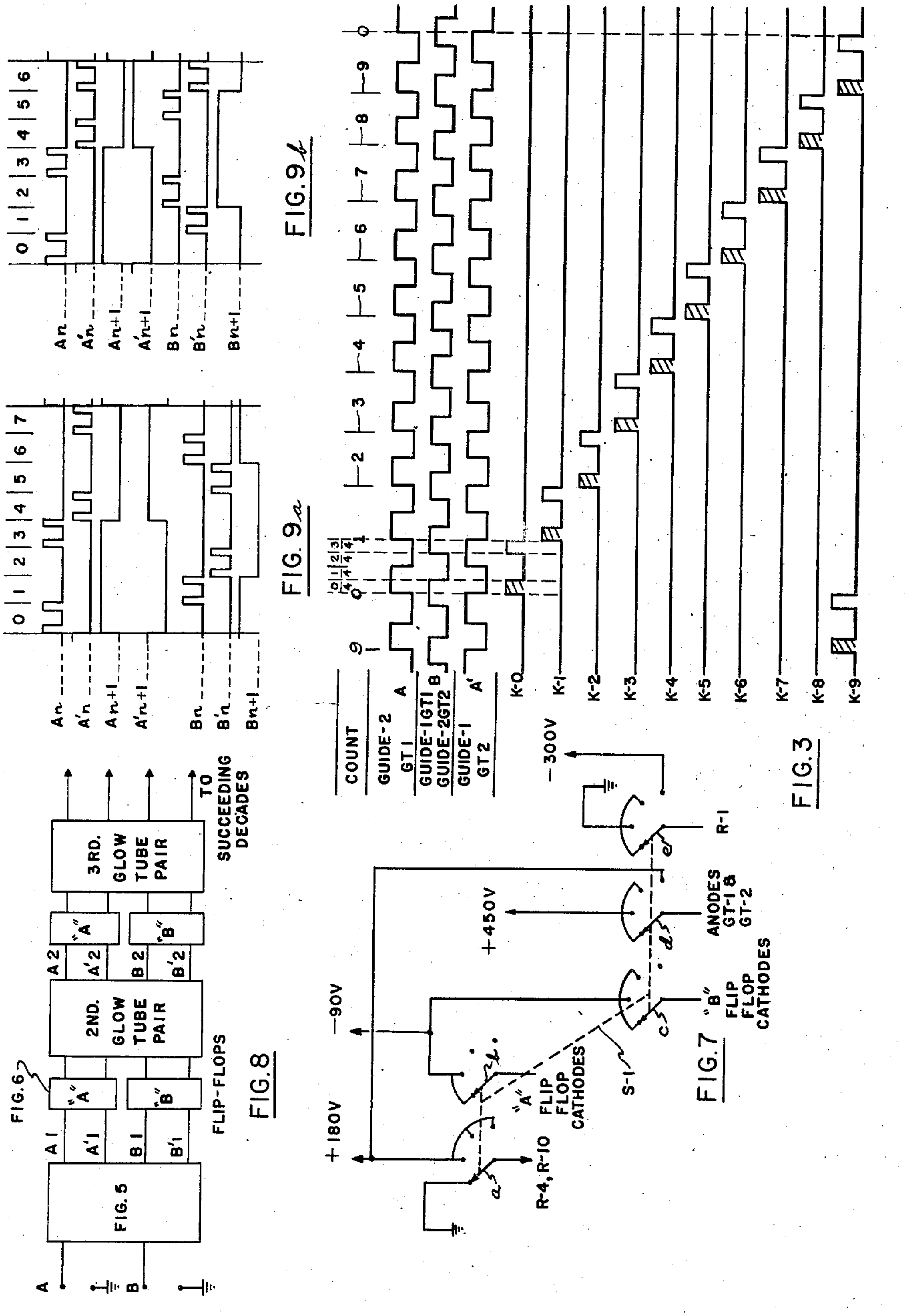
Fig. 3 is a diagram showing graphically the potentials appearing on certain elements of a pair of gaseous glow tubes used in practising the invention during ten unit counts or one complete counting cycle.
Fig. 7 illustrates a re-set switching circuit which may be utilized to reset the counting circuits to a predetermined desired count.
Fig. 8 shows in block diagram form (for sake of clarity) how counting circuits constructed according to the invention may be cascaded.

Fig. 9*a* illustrates graphically various circuit potentials in an alternative embodiment of our invention in which a different base number is utilized, and Fig. 9*b* illustrates graphically various circuit potentials in yet another embodiment of the invention for counting with another base number. In Figures 2, 3, 4, 9*a* and 9*b*, the potentials plotted are not drawn to any particular scale. For convenience, all the pulses are shown as being of the same magnitude, and those acquainted with the electrical arts will recognize that the diagrams do not attempt to show relative pulse magnitudes, but merely high or low voltage states.

Figure 1:
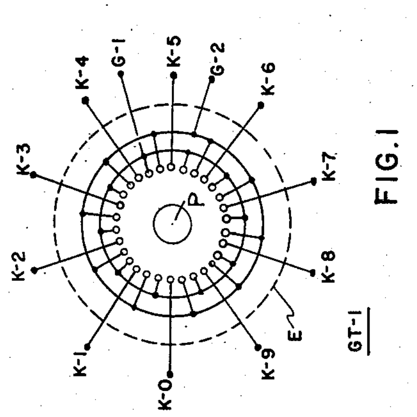
Fig. 1 is an electrical schematic diagram of the glow transfer tube utilized as a basic counting element in a preferred embodiment of the invention.

The present invention utilizes as its basic counting or translating element an Ericsson valve GS–10C, which is manufactured in England and distributed in the United States by Atomic Instruments, Inc. of Boston, Massachusetts. The operation of this glow transfer tube itself is described and explained in detail in Electronic Engineering, vol. 22, No. 173 (1950) in an article "The Dekatron" by Bacon and Pollard, and therefore only a brief description of its operation will be set forth herein. It will become apparent, however, as the description proceeds, that the present invention is not limited to precisely that particular glow transfer tube, and that similar tubes may be utilized in practising the invention. Fig. 1 shows schematically a cold cathode gaseous discharge valve GT–1 having a total of thirty-one elements. Ten of these elements are referred to for convenience as "cathodes," and are identified in Fig. 1 by the symbols K–0 to K–9. The ten cathodes are arranged equidistantly in circular array about a disc-shaped anode P within a gas-filled envelope E, and terminals for external connections are brought out of the envelope.

Situated between each adjacent pair of cathodes are two similar elements which may be referred to for convenience as "guides." Those guides located immediately clockwise from their respective cathodes are all interconnected and may be referred to collectively as "guide set one," and an external terminal G1 is provided for connection to "guide set one." Those guides disposed immediately clockwise from the G–1 guides are all interconnected and may be referred to collectively as "guide set two."

If a voltage in excess of the ionization potential is applied to the anode P and a given cathode, a gaseous glow discharge will be established between the anode P and the cathode. Assume that anode P in Fig. 1 is connected to a source of positive constant direct voltage and that a voltage sufficiently negative with respect thereto is applied to cathode K–1, so that a glow discharge exists between anode P and cathode K–1. Now, if a more negative voltage than that on cathode K–1 is applied to G1, the terminal of "guide set one," the glow may be established from anode P to the adjacent guide of guide set one and will no longer exist between cathode K–1 and anode P. Resistances may be inserted in the cathode and guide circuits so that anode current is limited at any one time to one cathode, to one guide or two guides, but never to a guide and cathode. Thus it will be seen that the glow has been translated clockwise. If next the potential of guide set two is made as negative as that of guide set one, the glow will become established between anode P and both the G–1 and G–2 guides immediately clockwise of cathode K–1. Now, if the potential of guide set one is made more positive, the glow to guide one will be extinguished and a glow will exist between anode P and guide two only. Finally, if the potential of both guide sets is made less negative, the glow will be transferred clockwise to adjacent cathode K–2. Thus it may be seen that a transfer from one cathode to an adjacent cathode, or a "count of one" has been made.

By arbitrarily numbering the cathodes successively from zero to nine in a given direction, the count will progress in an additive manner if the glow is transferred in that direction. By sampling the cathode potential it is possible to sense electrically the position of the glow discharge. By viewing the top or face of the tube one may see the position of the glow discharge, and by placing numerals on or adjacent the tube, a visual indication of the count may also be provided.

If, in the unit count described above, the order of lowering (making more negative) of the guide set potentials were reversed, so that guide set two potentials were lowered before guide set one potentials, the discharge would have been transferred in an opposite, or counterclockwise direction, going from cathode 1 to guide set 2 situated immediately counterclockwise from cathode K–1, and then progressing through the remainder of a similar but reversed unit count to be transferred to cathode K–0.

It may be noted that a unit count (transfer from a given cathode to an adjacent cathode) is comprised of four distinct states. Since the voltages applied to lower and raise the potentials of the guide sets vary the direction of counting according to their order of application, and since they are applied in four different stages per unit count, it may be seen that reversing the count (addition to subtraction, or vice versa) may be done at any quarter of the counting cycle. However, the duration of each quarter-cycle following reversal should not be much less than approximately 60 microseconds with presently available tubes, since this is about the minimum time required to complete the transfer of the glow discharge. Thus the fastest counting cycle cannot be completed in much less than about 250 microseconds, and consequently the maximum counting speed which the device may be capable of handling with perfect reliability may be about 4,000 counts per second. This speed is entirely adequate for numerous applications.

Figure 2:
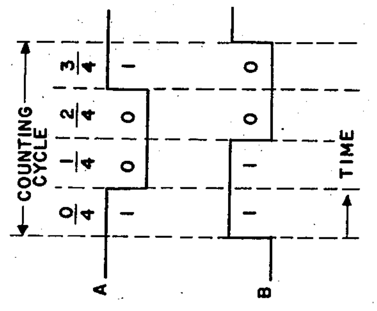
Fig. 2 is a diagram showing graphically the potentials applied to certain elements of the device of Fig. 1 during one unit count.

Referring to Fig. 2 there is shown a diagram illustrating graphically the condition of the potentials on the guides during each quarter of one complete clockwise counting cycle. The potential with respect to ground of guide set one is illustrated by line A, and the potential of guide set two is described by line B. It will be seen that the voltages represented by lines A and B are 90° out of phase, with potential A leading by one quarter-cycle. If the potential B were applied to guide set one, the counting would progress in a counter-clockwise manner. It will be apparent to those skilled in the art that pairs of such voltages phased 90° apart in accordance with direction are commonly produced as outputs from numerous electrical and electronic devices. The Root and Stabler patents referred to above are examples of devices, each of which detects motion by means of two photocells, whose output voltages are phased according to direction of motion.

As voltages such as those shown graphically in Fig. 2 are applied to the guide sets, the count will progress continuously around the tube by repetition of the unit counting cycle. Since the electrodes are spaced symetrically in circular array about the anode, their numeral designation may be entirely arbitrary. Therefore, no special resetting provision need be made for translating from K–9 to K–0, or from K–0 to K–9, such as would be necessary in prior art counting tubes in which the elements are arranged in straight-line fashion.

In most counting or translating problems it is necessary that counts be made of many more than ten pulses, and while some additional cathodes and guides may be provided, it becomes desirable to provide succeeding higher order decades so that counts of tens, hundreds, thousands, ten-thousands, etc., may be made. It will be apparent, however, that an output signal derived by sampling the cathode potential of one of the cathodes of the tube of Fig. 1 is not suitable for operating a succeeding similar decade counter. In order that a similar decade counter may be operated by the output of the first counter, two voltages out of phase according to counting direction, and having a rate of repetition one-tenth of that the original input voltages must be provided. In addition, the count must be able to proceed from a higher order decade to a lower order decade, as well as in the reverse direction.

Referring to Fig. 3 there are shown graphically the guide set and cathode potentials of the tube GT–1 with respect to ground for ten counter-clockwise unit counts, or one counter-clockwise counting cycle. Line A represents the potential on guide set two of GT–1 and line B represents the potential on guide set one of GT–1. As may be seen from Fig. 3, there exists a glow discharge between anode P and one or more guides during three-fourths of a unit count from 9 to 0. This is because there is a lowered potential on either guide set or both guide sets during three-fourths of the unit count. But during the first quarter of a transfer from K–9 to K–0, or during the last quarter cycle of a transfer from K–0 to K–9, no discharge exists to either of the guides of GT–1. This means that during that particular quarter, a succeeding higher order decade attached to be operated upon a count of ten will not have an electrical signal to indicate the direction of counting. Hence a reversal of counting during a transfer from 9 to 0 or from 0 to 9 would have electrical "backlash," so that a miscount might be obtained if the counter indication were to be read during the particular quarter of the count. The invention eliminates such backlash by provision of a novel circuit comprising a second glow transfer tube GT–2, which counts in similar manner to GT–1, but which is connected so as to lag or lead three-fourths of a unit count behind or ahead of the first counting tube GT–1.

It may be seen that since the manner of application of guide set voltages determines the glow transfer, that GT–2 may be caused to be three-quarters of a unit count behind or ahead of GT–1 by applying guide set voltages to GT–2 which lag or lead GT–1 guide set voltages by this amount.

As shown in Fig. 3, voltage A (which is connected to guide set two of tube GT–1) lags voltage B by one quarter count, which is electrically the same as leading voltage B by three-quarters of a unit count. Therefore, if voltage B is applied to guide set one of GT–2, guide set one of GT–2 will have potential lagging behind that of guide set one of GT–1 by three quarters of a unit count. In order to make guide set two of GT–2 also lag three quarters of a unit count behind guide set two of GT–1, a voltage shown graphically as A′ in Figure 3 is applied to guide set two of GT–2. Voltage A′ may be seen to be the inverse of voltage A. In Fig. 3 lines K–0 through K–9 illustrate cathode potentials during ten complete counter-clockwise unit counts, or one counter-clockwise counting cycle. The shaded pulses indicate rises in cathode potentials due to current flow to GT–1 cathodes, and the unshaded pulses indicate rises in cathode potentials due to current flow to GT–2 cathodes. It may be noted, and will have been made apparent from the above discussion that cathode current flows to raise cathode potential in each tube during that quarter of a unit count when none of its adjacent guides are at a lowered potential.

Figure 5:
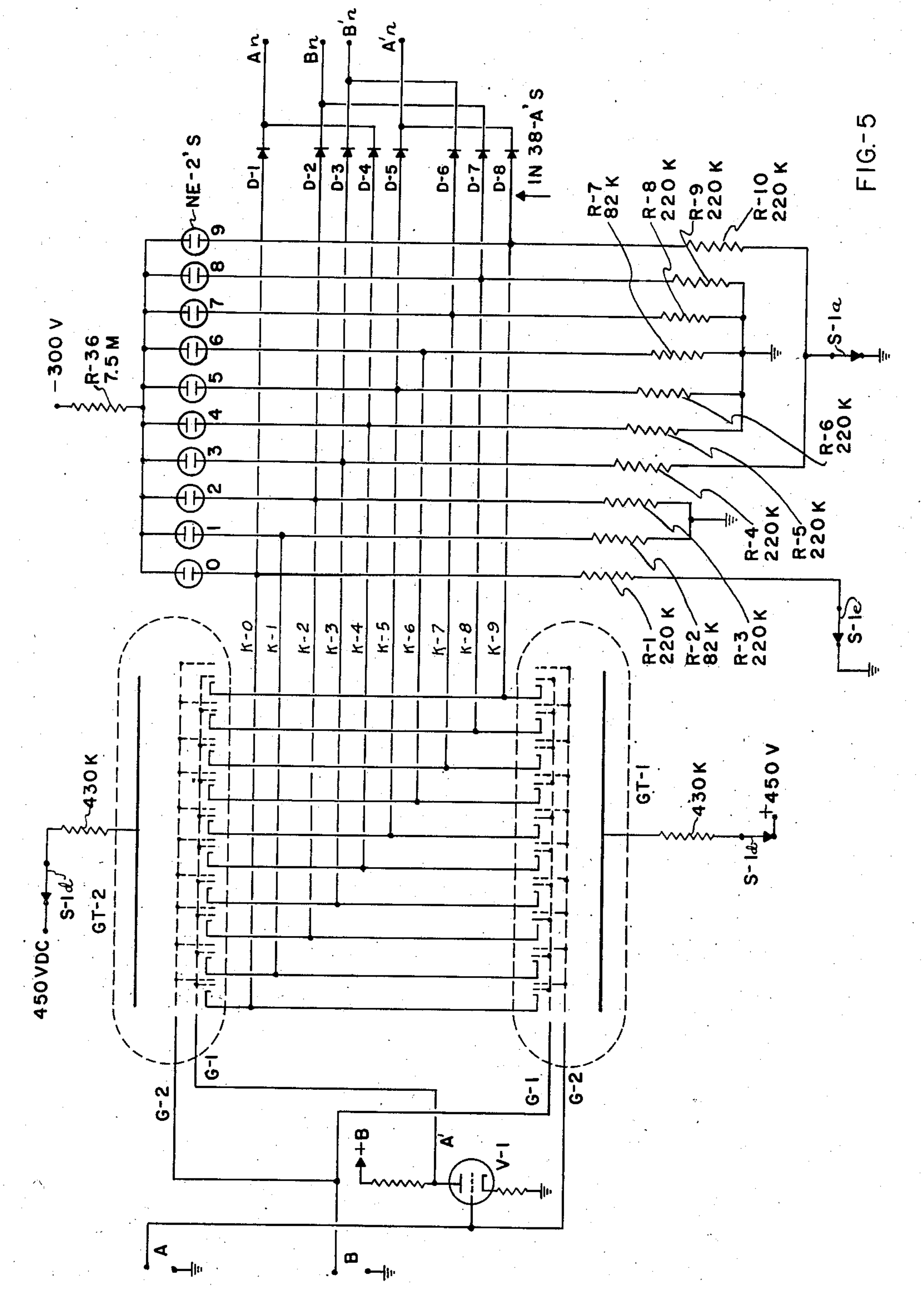
Fig. 5 is an electrical schematic diagram showing a typical counting stage constructed according to the invention.

Referring to Fig. 5 there is shown a circuit by means of which pulses of two voltages 90° out-of-phase may be counted and be made to provide suitable voltages for operating a similar but higher order decade without electrical backlash. The two input voltages, which may be supplied from the Root or Stabler devices, and which may be amplified and shaped, are applied to terminals A and B. The voltage applied to terminal A is used to operate guide set two of GT–1; the voltage applied to terminal B is used to operate guide set one of GT–1 and guide set two of GT–2, and a voltage A′ from the plate circuit of amplifier V–1 is used to operate guide set one of GT–2. Because of the phase inversion in amplifier V–1, a conventional direct-coupled amplifier, voltage A′ will be the inverse of voltage A. Thus it will be seen that the guide sets of tubes GT–1 and GT–2 will be driven by voltages such as those shown graphically in Fig. 3, and hence GT–1 and GT–2 will produce output pulses at their cathodes corresponding to the pulses shown in lines K–0 to K–9 in Fig. 3.

All corresponding cathodes of GT–1 and GT–2 are connected together and through common cathode resistors (R–1 to R–10) to ground potential as shown in Fig. 5. Cathodes K–0 and cathodes K–4 are connected together as shown through two diodes D–1 and D–4, and the junction point between the diodes is utilized as an output terminal A*n*. Connected as shown the diodes form an "or" circuit. A positive output voltage will therefore appear at output terminal A*n* whenever K–0 or K–4 of either gas tube is conducting. Cathodes K–5 and cathodes K–1 are similarly connected to an output terminal A′*n* through buffer diodes D–5 and D–8. Similarly, a B*n* channel is formed by connecting cathodes K–2 and K–8 to terminal B*n* through diodes D–2 and D–7 and a B′*n* channel is formed by connecting cathodes K–3 and K–7 to terminal B′*n* through diodes D–3 and D–6. The purpose of the buffer diodes will be explained below.

Figure 4:
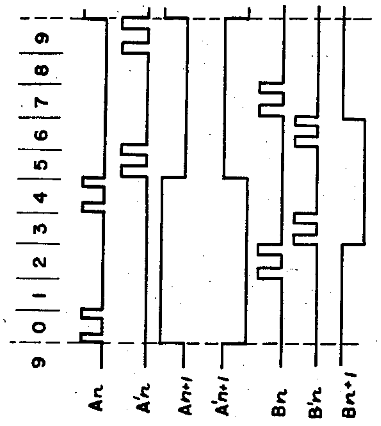
Fig. 4 is a diagram showing graphically the potentials appearing at certain output terminals connected to the gaseous glow transfer tubes during ten unit counts or one complete counting cycle, and also showing the voltages derived to actuate a succeeding, higher order counting stage.

As the circuit of Fig. 5 progresses through ten unit counts, or one complete counting cycle, the output voltages on terminals A*n*, A′*n*, B*n* and B′*n* will appear in a manner shown graphically in Fig. 4. Voltage A*n* can be seen to have positive steps at the first quarter of a "zero" or "ten" count when cathode K–0 of GT–1 conducts, at the last quarter of a "zero" or "ten" count when cathode K–0 of GT–2 conducts, at the first quarter of a "four" count when cathode K–4 of GT–1 conducts, and at the last quarter of a "four" count when cathode K–4 of GT–2 conducts. Terminals A′*n*, B*n* and B′*n* receive similar pulses as shown in Fig. 4.

Figure 6:
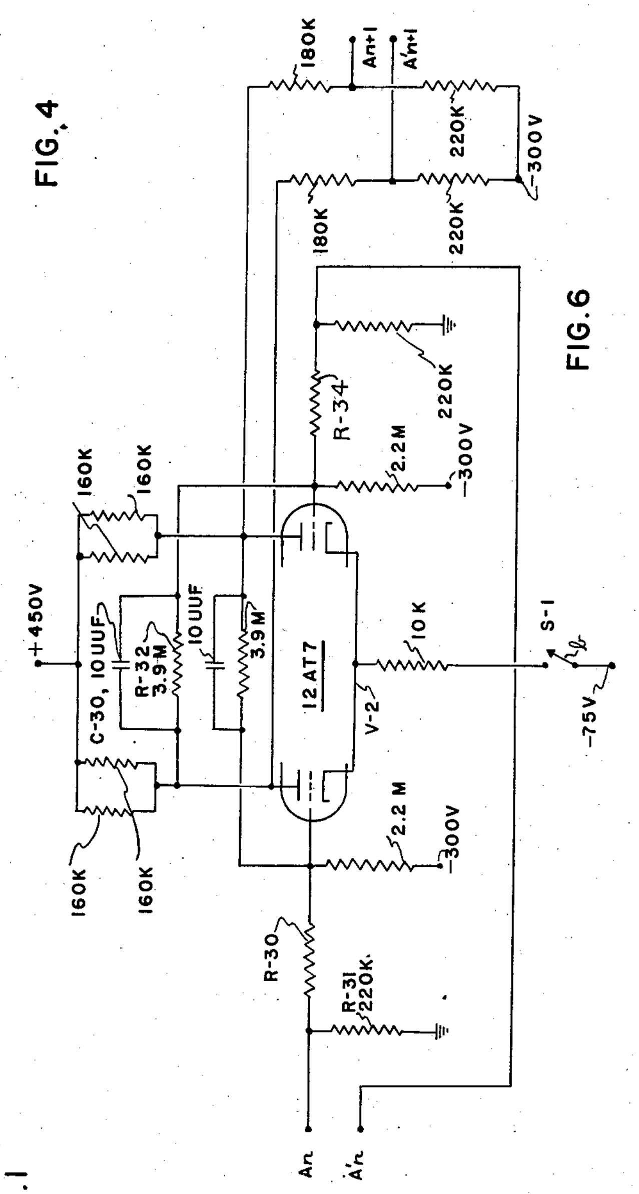
Fig. 6 is an electrical schematic diagram of a bi-stable flip-flop circuit which may be utilized in the invention.

If the output voltages at terminals A*n* and A′*n* are applied to the input circuit of the bi-stable flip-flop circuit shown in Fig. 6, output voltages such as those shown graphically in Fig. 4 as A*n*+1 and A′*n*−1 may be produced by the flip-flop.

As the positive pulse from cathode K–0 of GT–1 appears at terminal A*n* during the first quarter of a "zero" count, it is applied through resistor R–30 to the grid of the left triode section of duo-triode V–2, driving that section to saturation and decreasing the plate voltage of the left triode. The decrease in plate voltage is applied through resistor R–32 and capacitor C–30 to the grid of the right-hand triode section of tube V–2, causing that triode to cut off, thereby increasing its plate voltage. The saturation current in the left-hand triode causes a drop in voltage at terminal A′*n*+1, and the cutoff of current in the right-hand triode causes an increased voltage at terminal A*n*+1. These voltages are shown graphically in Fig. 4. As the positive pulse from cathode K–0 of GT–2 appears at terminal A*n* three-quarters of a unit count later, it will cause no change in state, since the left-hand triode section is already conducting at saturation. Also, when the two pulses from cathodes K–4 of G–1 and GT–2 appear at terminal A*n* during the "four" count, they will not cause any change of state. However, when the positive pulse from cathode K–5 of GT–1 appears at terminal A′*n* during the first quarter of the "five" count, and it is applied through resistor R–34 to the grid of the right-hand section of tube V–2, the flip-flop will be caused to change state, so that the right-hand triode will conduct at saturation and the left-hand triode will be cut off. This will cause the voltages at terminals A*n*+1 and A′*n*+1 to change as shown graphically in Fig. 4. While I have shown a specific type of bi-stable device, it will be apparent that transistor flip-flops and other bi-stable devices may be substituted for the circuit of Fig. 6 without departing from the invention.

If the terminals B*n* and B′*n* are similarly connected to an identical flip-flop, the voltage B*n*+1 may be obtained at a terminal connected similarly to terminal A*n*+1. Inspection of Fig. 4 and Fig. 2 will show that the voltages A*n*+1 and B*n*+1 are substantially 90° out-of-phase, and that voltage A′*n*+1, is the inverse of voltage A*n*+1, and further, that the A*n*+1, A′*n*+1 and B*n*+1 voltages change state one-tenth as rapidly as voltages A and B. Hence voltages have been provided at terminals A*n*+1, A′*n*+1 and B*n*+1 suitable for operating the guide sets of a succeeding higher order circuit similar to that of Fig. 5. It may be noted, however, that tube V–1 of Fig. 5 will have no counterpart in succeeding decades, since the "inverse" voltage is supplied at terminal A′*n*+. Each succeeding decade will consist of the balance of the circuit of Fig. 5, and the A, A′, B and B′ terminals will feed into pairs of flip-flops, each of which may be similar to the flip-flop shown in Fig. 6. The last, or highest order decade will not, of course, need to have flip-flops following.

Shown in Fig. 8 in block diagram form for sake of clarity is a three-decade counter. Input voltages 90° out-of-phase at terminals A and B operate the circuit of Fig. 5 to produce voltages to drive the "A" and "B" flip flops. The output voltages from the flip-flops drive the second glow tube pair, which in turn, drives a succeeding pair of flip-flops, etc. In practicing the invention six and more decades have been cascaded as shown. It will be apparent that other counting circuits may be employed in conjunction with the invention for particular counting applications. For example, counting circuits utilizing "hard" vacuum tubes may be deemed to be more suitable in the first, or fast lower order decades, and the slower higher order decades may comprise mechanical counting devices. It will also be apparent that shaping or amplifying tubes may be inserted, if desired, between counting decades to amplify the glow tube outputs before they are applied to the succeeding flip-flops.

If the count is progressing additively as time progresses, as in the example above, the flip-flops will always be triggered by pulses from cathodes of GT–1, because GT–1 will always be three-quarters of a unit count ahead of GT–2. If the count is subtracting, the flip-flops will always be triggered by pulses from GT–2. It will now become apparent that the electrical backlash at a count from 9 to 0 or from 0 to 9 has been eliminated, since an electrical signal will be present at all times to indicate to a succeeding decade the direction of the count. For example, if the counter is adding from 9 to 0, the formerly ambiguous quarter-count between 9 and 10 when neither guide of GT–1 is conducting will be accompanied by a state of GT–2 which indicates that the count is adding rather than subtracting.

Shown in Fig. 5 are means by which an additional visual indication of the count may be obtained. Connected to each common cathode terminal of the glow-discharge tubes is a neon indicating lamp, each shown as comprising a type NE–2 neon lamp, the other terminals of which are returned to a negative potential through resistor R–36. As each cathode conducts, drawing current through its cathode resistor, the voltage is increased across the neon tube sufficiently to make it ionize and conduct. The neon tube will remain conducting after the cathode voltage has dropped since it is connected through a cathode resistor to ground so as to keep the voltage across it above the required maintaining potential of the neon tube. However, when the succeeding cathode conducts, the voltage drop through resistor R–36 will lower the voltage so as to extinguish the first neon tube as soon as the succeeding neon tube fires. For such operation, the neon tubes utilized must have the property that their minimum signal level plus their minimum maintaining potential be larger than their maximum firing potential, and such property is usual in type NE–2 neon tubes. The purpose of the buffer diodes (D–1 to D–8) may now be understood. If D–1 were not provided, neon tube 0 would fire when cathodes K–4 conducted as well as when cathodes K–0 conducted due to the common connection at terminal A*n*. Hence it may be seen that each diode serves to prevent a false indication on an associated neon tube when the associated cathode is not conducting. It will be apparent that the diodes may be eliminated if the external neon visual indication is not required on a particular decade.

It will be apparent that the guide set potentials applied to the GT–1 and GT–2 pairs in each decade must be three-quarters of a unit count out-of-phase, and hence it becomes important to provide a means by which this may be assured initially. It is also desirable in most counting devices to have a re-setting means to return the count to zero or to some other desired count.

Shown in Fig. 7 is a switching circuit which may be utilized in re-setting the invention. The system shown resets the counter to the second quarter (2/4) of the zero-count. Reference to Fig. 3 will show that during any 2/4 period both guide sets of GT–1 will be conducting, that guide set 2 of GT–2 will be conducting, and that guide set 1 of GT–2 will not be conducting. In order to cause such conduction, all K–3 and K–9 cathode resistors (R–4 and R–10) are connected to a positive potential by contact arm "*a*" of manual reset switch S–1. Next, contact arms "*b*" and "*c*" reset switch S–1 disconnect all flip-flop common-cathode resistors, making the voltage high on all guide electrodes and thus forcing the glow to transfer to a cathode. Then, contact arm "*d*" of switch S–1 lowers the anode supply voltage to the glow transfer tubes, so that no glow will then exist to any cathode and then contact arm "*e*" of switch S–1 connects the zero cathode resistor to a high negative potential so that conduction is caused between the anode and cathode K–0. In order to effect the foregoing steps, manual reset switch S–1 of Fig. 7 is operated so as to move its contact arms clockwise as shown in Fig. 7. If switch S–1 is then moved counter-clockwise, the anode supply voltage is again raised and the K–0 cathode resistor R–1 is again grounded. It will be apparent that a switching circuit similar to that of Fig. 7 may be provided for each decade, and the resetting may be done either by individual re-setting or by ganging the several switches to reset all decades simultaneously. The contact arm "*c*" re-connects all cathode resistors of the B flip-flops to their supply voltage, transferring the glow from cathode K–0 to guide one of GT–1 and guide two of GT–2, since the voltage applied to the K–3 and K–9 cathode resistors of the previous stage makes the flip-flop assume a state so as to cause the voltages on the aforementioned guides to be low. Next, contact arm B connects the cathode resistors of all A flip-flops to their supply voltage. The voltage applied to the K–3 and K–9 cathode resistors of a stage causes the succeeding A flip-flops to assume a state so that A voltage is low and A′ voltage is high. This causes no change in GT–1, but causes the glow discharge in GT–2 to exist on the two guide electrodes located between the K–0 and K–9 cathode of GT–2. As reset switch S–1 reaches its counter-clockwise limit, contact arm "*a*" re-connects the K–3 and K–9 cathode resistors to ground. The voltages at terminals A and B are low, and the voltages at terminals A′ and B′ are high. It may be seen in Fig. 3 that the existing conditions are those which prevail upon a count of "½" (between 0 and 1). The counter is then ready to receive input pulses of either additive or subtractive nature. It will be apparent that while we have shown a reset system connected so as to return the count to "one-half," that the principles illustrated may be utilized to return the count to any desired number.

While there is shown illustratively a "decade" counter, it may be seen that the invention is not limited to counters utilizing a base number of ten. Glow discharge tubes similar to the type shown, but having a greater or lesser number of cathodes and guides may be utilized in counting with base numbers greater or smaller than "ten." Assume that the glow transfer tube provided has eight cathodes and sixteen guides in order that the counter may utilize a base number of "eight." Fig. 9 shows the glow tube cathode output pulses and flip-flop output pulses so as to count reversibly and to provide the correct output voltages for a succeeding higher order decade. In order to provide the correct voltage at terminals A*n*, A′*n*, B*n* and B′*n*, the corresponding cathodes of the two eight-position glow tubes would be connected together, and the pairs of cathodes would be connected to the terminals as follows: The "zero" and "three" cathodes would be connected to the A*n* terminal; and the "four" and "seven" cathodes would be connected to the A′*n* terminal; the "one" and "six" cathodes would be connected to the B*n* terminal; and the "two" and "five" cathodes would be connected to the B′*n* terminal.

While the "ten" counter and the "eight" counter have been illustrated respectively in Figures 4 and 9*a* as providing symmetrical and 90° displaced output voltages, it is not necessary that such output voltages be provided. The voltages applied to the succeeding flip-flops need not be symmetrical nor must they be 90° out-of-phase. It is necessary only that the output voltages each have two distinct states during each higher order counting cycle, and that the "A" output voltages do not change state at the same time as the "B" output voltages. Counters constructed according to the invention which utilize an odd base number may utilize asymmetrical output voltages to drive succeeding flip-flops. Such a system is illustrated graphically in Fig. 9*b* for counting with a base number of "seven." It will become apparent from inspection of Fig. 9*b* that the "zero" and "three" cathode pairs are connected to the A′*n* terminal, the "four" and "six" cathode pairs to the A*n* terminal, the "two" and "five" cathode pairs to the B*n* terminal, and the "one" and "six" cathode pairs to the B′*n* terminal. It may be seen that the output voltages are asymmetrical and not displaced 90 degrees. In practice it is desirable that the output voltages be made as symmetrical as possible in order to maximize the reliability of the counter if "noise" is present. If an output voltage to the succeeding flip-flops is greatly unsymmetrical, so that one state is very short in duration, and the other state is very long, the amount of "noise" that the counter will reject without counting error will be limited by the duration of the shortened output pulse, since a succeeding flip-flop may not be triggered if the pulse time is too short.

Various other suitable connections from the corresponding cathode pairs in order that the succeeding flip-flops may receive voltages out-of-phase which change state twice during each succeeding higher order counting cycle will become readily apparent in view of the disclosure. The principles exemplified above may be utilized in constructing counting stages having any base number above four.

It will also be apparent that the invention may be connected to actuate numerous devices upon occurrence of any predetermined count as well providing visual indications. For example, relays connected to each decade to be actuated by rises in voltage of particular cathodes may have their actuated contacts connected in series, so that closure of all the relays simultaneously actuates any desired electrical device. Numerous actuating circuits will be apparent to those skilled in the art.

While there have been shown in the drawings circuits labelled with specific values of resistance, capacitance, supply voltages and specific tube types, it is to be understood that such values and types are exemplary only, and that numerous possible changes will be readily apparent to those skilled in the art upon perusal of the disclosure without departing from the invention. It is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described our invention, what we claim as new and desire to secure by Letters Patent is:

1. A reversible direct-coupled counting circuit comprising in combination a pair of multi-electrode gaseous discharge counting devices each having a plurality of numbered elements, each numbered element being operable to produce an output pulse upon occurrence of a count corresponding to its number, and each device having a pair of translating means responsive to a pair of applied voltages phased in accordance with counting direction for translating a current to successive numbered elements of said devices, a pair of bistable flip-flops connected to receive pulses from two groups of said elements to change state twice during each unit count of an adjacent higher order counting circuit, and circuit means connected to each of said flip-flops to apply voltages to operate similar pairs of translating means of said succeeding higher order counting circuit.

2. A reversible counting circuit having a pair of counting devices, each of said counting devices having a plurality of numbered elements, each numbered element being operable to produce a signal upon occurrence of a count corresponding to its number and each device having a pair of translating means responsive to a pair of applied voltages phased in accordance with counting direction for translating a current to successive numbered elements of said devices, and a pair of bistable flip-flops connected to receive alternately pulses from selected groups of said elements to change the state of each flip-flop twice during each unit count of an adjacent higher order counting circuit.

3. A reversible counting circuit having a pair of multi-electrode counting devices, each of said counting devices having an anode element and a plurality of numbered elements arranged in circular array about said anode element in a gas-filled envelope, voltage means connected to said anode element and said numbered elements to cause a gaseous discharge current between said anode and one of said numbered elements, pairs of translating elements individual to each device each responsive to a pair of applied voltages phased in accordance with counting direction for translating said gaseous discharge current to successive numbered elements, the correspondingly numbered elements of each device being connected to common terminals, and a pair of bistable flip-flops each having a pair of input circuits, each of said input circuits being connected to a pair of said common terminals to change the state of each of said flip-flops twice during each unit count of an adjacent higher order counting circuit.

4. A reversible counting circuit having a pair of counting devices, each of said counting devices having a plurality of numbered elements, each numbered element being operable to produce a signal voltage upon occurrence of a count corresponding to its number and each device having a pair of translating means responsive to applied voltages phased in accordance with counting direction for translating a current to successive numbered elements of said devices, the applied voltages to said translating means being de-phased a fraction of a unit count, and a pair of bistable flip-flops connected to receive alternately pulses from selected groups of said numbered elements to change the state of each flip-flop twice during each unit count of an adjacent higher order counting circuit connected to be operated by output voltages from said flip-flops.

5. A reversible-direct-coupled counting circuit having a pair of multi-electrode counting devices, each of said counting devices having a plurality of numbered elements, each numbered element being operable to produce a voltage signal upon receipt of a translatable current, pairs of translating elements individual to each device each responsive to applied voltages phased in accordance with counting direction for translating said current successively to said numbered elements, and a pair of bistable flip-flops connected to receive alternately said voltage signals from selected groups of said numbered elements, each flip-flop being connected to two groups of corresponding pairs of numbered elements so as to change state twice during each unit count of a similar higher order counting circuit having similar translating elements connected to be actuated by the output voltages of said flip-flops.

6. Reversible counting apparatus comprising a plurality of translating circuits of accending order, each of said translating circuits having a pair of counting devices having a plurality of numbered elements, each numbered element being operable to produce a signal voltage upon occurrence of a count corresponding to its number and each device having a pair of translating means responsive to applied voltages phased in accordance with counting direction for translating a current to successive numbered elements of said devices, and a pair of bistable flip-flops connected to receive said signal voltages from selected groups of said numbered elements to change state twice during each unit count of the succeeding higher order translating circuit.

7. A reversible counting circuit having a pair of counting devices, each of said counting devices having a plurality of numbered elements each numbered element being operable to produce a signal upon occurrence of a count corresponding to its number and each device having a pair of translating means responsive to a pair of applied voltages phased in accordance with counting direction for translating a current to successive numbered elements of said devices, and a plurality of numbered indicating means connected to said numbered elements to indicate the number of the count, the correspondingly numbered elements of said devices being interconnected.

8. A reversible counting circuit comprising in combination a pair of multi-electrode gaseous discharge counting devices each having a plurality of numbered elements, each numbered element being operable to produce an output voltage upon occurrence of a count corresponding to its number, and each device having translating elements responsive to applied voltages phased in accordance with counting direction for translating a current to successive numbered elements of said devices, the correspondingly numbered elements of each device being connected together and the voltages applied to the translating elements of one device being dephased with respect to the voltages applied to the translating elements of the other device, and actuating means connected to groups of said numbered elements to be operated upon occurrence of a predetermined count.

9. A reversible counting circuit having a pair of multi-electrode counting devices, each of said counting devices having an anode element and a plurality of numbered elements arranged successively in circular array about said anode element, voltage means connected to said anode element and said numbered elements to cause a current flow between said anode and one of said numbered elements, pairs of translating elements individual to each device, each pair of elements being responsive to applied voltages phased in accordance with counting direction for translating said current flow to successive numbered elements in each counting device, the correspondingly numbered elements of each device being connected to common terminals, the voltages applied to the pair of translating elements of one counting device being dephased a fraction of a unit count with respect to the voltages applied to the pair of translating elements of the other counting device, and a pair of bi-stable flip-flop devices each having a pair of input terminals, each of said input terminals being connected to two of said common terminals to change the state of each of said flip-flop devices twice during each unit count of an adjacent higher order counting circuit.

10. A reversible counting circuit having a pair of multi-electrode counting devices, each of said counting devices having an anode element and ten numbered cathode elements arranged successively in circular array about said anode element, voltage means connected to said anode element and to said cathode elements to cause a current flow between said anode element and one of said cathode elements, guide means interposed between successive cathode elements and responsive to applied voltages phased in accordance with counting direction for transferring said current flow to successive cathode elements, the voltages to the guide means of each counting device being three-quarters of a unit count out of phase, the correspondingly numbered cathodes of each device being connected to common terminals, and a pair of bi-stable flip-flop devices each having a pair of input circuits, each flip-flop input circuit being connected to pairs of common terminals to receive actuating voltage signals at the end of and the beginning of different instants of a unit count of higher order to produce two phase-displaced voltages to be applied to similar guide means of a succeeding higher order counting circuit.

11. A reversible counting circuit having a pair of counting devices, each of said devices having a plurality of numbered elements, each numbered element being operable to produce a signal upon occurrence of a count corresponding to its number and each device having a pair of translating means responsive to a pair of applied voltages phased in accordance with counting direction for translating a current to successive numbered elements of said devices, and a pair of bistable flip-flops connected to groups of numbered elements to receive alternately pulses at the end and beginning of different half-cycles of two phase-displaced voltages applied to a succeeding higher order counting circuit.

12. A reversible counting circuit having a pair of counting devices, each of said devices having a plurality of numbered elements, each numbered element being operable to produce an output signal pulse upon occurrence of a count corresponding to its number and each device having a pair of translating means responsive to a pair of applied voltages phased in accordance with counting direction for translating a current to successive numbered elements of said devices, and a pair of bi-stable flip-flops each having a pair of input circuits, the first of said flip-flops being connected to receive pulses on one of its input circuits during first and sixth instants of time and pulses on its other input circuit during second and fifth instants of time, the second of said flip-flops being connected to receive pulses on one of its input circuits during third and eighth instants of time and pulses on its other input circuit during fourth and seventh instants of time.

13. A reversible counting circuit having a pair of counting devices, each of said devices having a plurality of numbered elements operable to produce an output signal pulse upon receipt of a translatable current flow and a pair of translating means responsive to a pair of applied voltages phased in accordance with counting direction for translating said current flow successively to said numbered elements, correspondingly numbered elements of each device being interconnected, and said pairs of applied voltages being de-phased a fraction of a unit counting cycle, and a pair of bistable flip-flops each having a pair of input circuits, the first of said flip-flops being connected to receive pulses on one of its input circuits during first and sixth instants and on its other input circuit during second and fifth instants, the second of said flip-flops being connected to receive pulses on one of its input circuits during third and eighth instants and on its other input circuit during fourth and seventh instants, and circuit means connected to apply the output voltages of said flip-flops to the translating means of a succeeding higher order reversible counting circuit.

14. A reversible counting circuit having a pair of counting devices, each of said devices having a plurality of numbered elements operable to produce an output signal pulse upon receipt of a translatable current flow and a pair of translating means responsive to a pair of applied voltages phased in accordance with counting direction for translating said current flow successively to said numbered elements, the correspondingly numbered elements of each device being interconnected, and said pairs of applied voltages being de-phased a fraction of a unit counting cycle, and a pair of bistable flip-flops each having a pair of input circuits, the first of said flip-flops being connected to receive pulses at one of its input circuits during first and fourth instants and at its other input circuit during fifth and eighth instants, the second of said flip-flops being connected to receive pulses at one of its input circuits during second and seventh instants and at its other input circuit during third and sixth instants.

15. A reversible counting circuit comprising in combination a pair of multi-electrode counting devices, each of said counting devices having an anode element and a base number of numbered elements arranged successively in circular array about said anode element, means for applying a potential between said anode element and said cathode elements to cause a current flow between said anode element and one of said cathode elements, guide elements interposed between successive cathode elements, each of said guide elements being operable upon receipt of an operating potential to attract said current flow away from its adjacent cathode element, each of said guide elements situated clockwise from its respective adjacent cathode being connected to a first input terminal of each device and each of said guide elements situated counter-clockwise from its respective adjacent cathode being connected to a second input terminal of each device, means for applying a pair of alternating input potentials individually to the first and second input terminals of each device, the potentials applied to the input terminals of one of said devices being de-phased with respect to the potentials applied to the input terminals of the other of said devices, circuit means interconnecting the correspondingly numbered cathode elements of each device to provide common terminals, a pair of bi-stable devices each having a pair of input circuits and output circuits, and circuit means connecting a different pair of said common terminals to each input circuit of said bi-stable devices.

16. A reversible counting circuit having a pair of counting devices, each of said counting devices having a base number of numbered elements, each numbered element being operable to produce a potential upon receipt of a translatable current, and each device having a pair of translating means responsive to a pair of applied input voltages phased in accordance with counting direction for translating said current successively to said numbered elements, the correspondingly numbered elements of the devices being interconnected at common terminals, and four of said common terminals being connected to different control terminals of a pair of bi-stable devices.

References Cited in the file of this patent

UNITED STATES PATENTS 2,774,534 Dunn ---------------- Dec. 18, 1956

OTHER REFERENCES

"A Cold Cathode Batching Counter" by Tooke, Electronic Engineering, page 160, April 1954.